US011384184B2

(12) United States Patent
Takeshita et al.

(10) Patent No.: US 11,384,184 B2
(45) Date of Patent: Jul. 12, 2022

(54) MELT-FORMABLE ETHYLENE-VINYL ALCOHOL COPOLYMER COMPOSITION, PELLETS, AND MULTILAYER STRUCTURE

(71) Applicant: Mitsubishi Chemical Corporation, Tokyo (JP)

(72) Inventors: Keisuke Takeshita, Tokyo (JP); Takuya Nakajima, Tokyo (JP); Daichi Nishimura, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 324 days.

(21) Appl. No.: 16/659,899

(22) Filed: Oct. 22, 2019

(65) Prior Publication Data

US 2020/0048387 A1    Feb. 13, 2020

Related U.S. Application Data

(63) Continuation of application No. PCT/JP2018/024311, filed on Jun. 27, 2018.

(30) Foreign Application Priority Data

Jun. 27, 2017    (JP) .............................. JP2017-124870

(51) Int. Cl.
| | | |
|---|---|---|
| *B32B 7/12* | (2006.01) | |
| *B32B 27/08* | (2006.01) | |
| *B32B 27/34* | (2006.01) | |
| *B32B 27/36* | (2006.01) | |
| *B32B 27/40* | (2006.01) | |
| *B32B 27/28* | (2006.01) | |
| *B65D 65/40* | (2006.01) | |
| *B65D 85/72* | (2006.01) | |
| *C08K 3/32* | (2006.01) | |
| *C08K 3/11* | (2018.01) | |
| *B29B 9/06* | (2006.01) | |
| *B29B 9/12* | (2006.01) | |
| *C08F 216/06* | (2006.01) | |
| *B32B 27/30* | (2006.01) | |
| *C08K 5/098* | (2006.01) | |
| *C08K 13/02* | (2006.01) | |
| *B29K 23/00* | (2006.01) | |

(52) U.S. Cl.
CPC .............. *C08F 216/06* (2013.01); *B29B 9/06* (2013.01); *B32B 27/306* (2013.01); *C08K 3/32* (2013.01); *C08K 5/098* (2013.01); *C08K 13/02* (2013.01); *B29K 2023/086* (2013.01); *B65D 65/40* (2013.01); *B65D 85/72* (2013.01); *C08F 2800/10* (2013.01); *C08K 2003/328* (2013.01)

(58) Field of Classification Search
None
See application file for complete search history.

(56) References Cited

U.S. PATENT DOCUMENTS

| | | |
|---|---|---|
| 6,232,382 B1 | 5/2001 | Ninomiya et al. |
| 6,242,087 B1 | 6/2001 | Kawai |
| 6,759,107 B1 | 7/2004 | Tai et al. |
| 2003/0022974 A1 | 1/2003 | Shinji et al. |
| 2003/0157283 A1* | 8/2003 | Tai ...................... C08L 2666/24 428/35.7 |
| 2010/0285273 A1 | 11/2010 | Abe et al. |
| 2010/0314791 A1 | 12/2010 | Fujimura et al. |
| 2011/0040012 A1 | 2/2011 | Chai et al. |
| 2013/0018133 A1 | 1/2013 | Yamasaki et al. |
| 2016/0229987 A1 | 8/2016 | Kawai et al. |
| 2017/0130006 A1 | 5/2017 | Saito et al. |
| 2017/0203278 A1 | 7/2017 | Hirose |
| 2019/0002612 A1 | 1/2019 | Nishimura et al. |

FOREIGN PATENT DOCUMENTS

| | | |
|---|---|---|
| CN | 1290209 A | 4/2001 |
| CN | 1392889 A | 1/2003 |
| CN | 102076758 A | 5/2011 |
| CN | 106488957 A | 3/2017 |
| CN | 106574038 A | 4/2017 |
| EP | 1316582 A1 | 6/2003 |
| EP | 2112201 A1 | 10/2009 |
| EP | 3 398 990 | 12/2016 |
| JP | 58-222102 | 12/1983 |
| JP | 6-128433 | 5/1994 |
| JP | 7-330994 | 12/1995 |
| JP | 11-106592 | 4/1999 |
| JP | 2000-136281 | 5/2000 |
| JP | 2001-072873 A | 3/2001 |
| JP | 2001-106920 A | 4/2001 |
| JP | 2001-115274 | 4/2001 |
| JP | 2001-347612 | 12/2001 |
| JP | 2002-45851 | 2/2002 |
| JP | 2006-96816 | 4/2006 |
| JP | 2008-230112 | 10/2008 |

(Continued)

OTHER PUBLICATIONS

ISR issued in WIPO Patent Application No. PCT/JP2018/024311, dated Aug. 14, 2018 (English translation).

(Continued)

*Primary Examiner* — Sheeba Ahmed

(74) *Attorney, Agent, or Firm* — Greenblum & Bernstein, P.L.C.

(57) ABSTRACT

A melt-formable ethylene-vinyl alcohol copolymer composition contains: (A) an ethylene-vinyl alcohol copolymer; (B) an alkali metal compound; and (C) an iron compound; wherein the weight ratio of the alkali metal compound (B) to the iron compound (C) on a metal basis is 10 to 100,000. The viscosity of the melt-formable ethylene-vinyl alcohol copolymer composition decreases with time during melt forming, rendering it excellent in long-run formability.

5 Claims, No Drawings

(56) References Cited

FOREIGN PATENT DOCUMENTS

| JP | 2012-179723 A | 9/2012 |
|---|---|---|
| JP | 2012-206318 | 10/2012 |
| JP | 2015-83377 | 4/2015 |
| RU | 2495063 C2 | 10/2013 |
| RU | 2599297 C2 | 10/2016 |
| TW | I417308 | 12/2013 |
| WO | 2008/149642 | 12/2008 |
| WO | 2013/146533 | 10/2013 |
| WO | 2017/115847 A1 | 7/2017 |

OTHER PUBLICATIONS

IPRP issued in WIPO Patent Application No. PCT/JP2018/024311, dated Dec. 31, 2019 (English translation).
ISR issued in WIPO Patent Application No. PCT/JP2016/089122, dated Feb. 7, 2017.
IPRP issued in WIPO Patent Application No. PCT/JP2016/089122, dated Jul. 3, 2018.
Office Action issued in SG Patent Appl. No. 11201804720P, dated Jun. 26, 2019.
ISR issued in WIPO Patent Application No. PCT/JP2016/089124, dated Mar. 28, 2017.
IPRP issuedin WIPO Patent Application No. PCT/JP2016/089124, dated Jul. 3, 2018 (English translation).
Supplemental European Search Report for EP Patent Application No. 16881823.5, dated Jul. 2, 2019.
Office Action issued in Indian Patent Application No. 201937050524, dated Apr. 29, 2021.
Singaporean Office Action issued for SG Patent Application No. 11201909986V, dated Nov. 9, 2020.
Office Action issued in Chinese Patent Application No. 201880024136.2, dated Aug. 12, 2021, English translation.
Office Action issued in Taiwanese Patent Application No. 107122178, dated Sep. 15, 2021, English translation.
Office Action issued in Japanese Patent Application No. 2018-534192, dated Sep. 21, 2021, English translation.
European Search Report issued for European Patent Application No. 18823753.1 dated Jun. 5, 2020.
Decision of Refusal issued in Japanese Patent Application No. 2018-534192, dated Apr. 12, 2022, translation.

\* cited by examiner

MELT-FORMABLE ETHYLENE-VINYL ALCOHOL COPOLYMER COMPOSITION, PELLETS, AND MULTILAYER STRUCTURE

RELATED APPLICATION

This application is a continuation of International Application No. PCT/JP2018/024311, filed on Jun. 27, 2018, which claims priority to Japanese Patent Application No. 2017-124870, filed on Jun. 27, 2017, the entire contents of each of which being hereby incorporated by reference.

TECHNICAL FIELD

The present disclosure relates to a melt-formable EVOH resin composition containing an ethylene-vinyl alcohol copolymer (hereinafter sometimes referred to simply as "EVOH resin") as a main component, and further relates to pellets and a multilayer structure. More specifically, the present disclosure relates to a melt-formable EVOH resin composition excellent in long-run melt formability, and to pellets and a multilayer structure.

BACKGROUND ART

EVOH resin is excellent in transparency, gas barrier properties such as oxygen barrier property, aroma retaining property, solvent resistance, oil resistance, and mechanical strength, and is widely used as packaging materials such as food packaging materials, pharmaceutical product packaging materials, industrial chemical packaging materials, and agricultural chemical packaging materials.

However, the EVOH resin contains relatively active hydroxyl groups in its molecule and, therefore, is liable to experience oxidation reaction and crosslinking reaction when being melted at a higher temperature even in a generally oxygen-free environment within an extruder. This tends to increase the viscosity of the EVOH resin with time, making it difficult to stably process the EVOH resin. To solve this problem, for example, PTL 1 discloses a resin composition which contains: (A) a saponified ethylene-vinyl acetate copolymer having an ethylene content of 20 to 60 mol % and a saponification degree of not less than 90 mol %; (B) acetic acid; and (C) magnesium acetate and/or calcium acetate; wherein the component (B) is present in an amount of not greater than 0.05 parts by weight based on 100 parts by weight of the component (A); wherein the component (C) is present in an amount of 0.001 to 0.02 parts by weight on a metal basis based on 100 parts by weight of the component (A). The resin composition is excellent in long-run melt formability, and can provide a formed product excellent in appearance substantially without fisheyes, streaks, and coloration. Where the formed product is provided in the form of a laminate, the laminate is less susceptible to odor emanation. The resin composition ensures excellent interlayer adhesiveness of the laminate even after the laminate is subjected to secondary processes such as stretching and deep drawing.

RELATED ART DOCUMENT

Patent Document

PTL 1: JP-A-HEI11(1999)-106592

SUMMARY

In recent years, forming apparatuses tend to have higher functionalities to cope with diversification of feed block and die shapes of the forming apparatuses and higher functional requirements for layer thickness reduction and layer number increase of multilayer structures to be formed as final products by the forming apparatuses. On the other hand, the resin of PTL 1 is liable to deteriorate in such a forming apparatus having an internal structure complicated due to the higher functional requirements to contaminate the final products, which in turn fail to satisfy acceptance criteria, thereby reducing the productivity. Therefore, the resin composition needs improvement.

The inventors conducted studies on a structural portion of the forming apparatus inevitably causing stagnation of the resin, and supposed that the deterioration of the resin occurs due to the stagnation. Then, the inventors came up with an idea of providing an EVOH resin composition having a viscosity that decreases with time during heating for the prevention of the deterioration of the resin.

As a result of the intensive studies conducted in view of the foregoing, the inventors found that the aforementioned problem can be solved by incorporating an iron compound and an alkali metal compound at a specific weight ratio to the EVOH resin composition. It is conventionally known that the alkali metal compound is used as a heat stabilizer for the EVOH resin, but it is not known that, where a very small amount of the iron compound is used in combination with the alkali metal compound, the viscosity of the EVOH resin decreases with time during the heating. The inventors unexpectedly found that, where the iron compound and the alkali metal compound are contained at the specific weight ratio in the EVOH resin composition, the viscosity of the EVOH resin composition decreases with time during the heating, thereby improving the long-run formability.

According to a first aspect of the present disclosure, there is provided a melt-formable EVOH resin composition comprising: (A) an EVOH resin; (B) an alkali metal compound; and (C) an iron compound; wherein the weight ratio of the alkali metal compound (B) to the iron compound (C) on a metal basis is 10 to 100,000. According to a second aspect of the present disclosure, pellets formed from the melt-formable EVOH resin composition are provided. According to a third aspect of the present disclosure, a multilayer structure including a layer formed from the melt-formable EVOH resin composition is provided.

The melt-formable EVOH resin composition of the present disclosure contains the EVOH resin (A), the alkali metal compound (B), and the iron compound (C). In the EVOH resin composition, the weight ratio of the alkali metal compound (B) to the iron compound (C) on a metal basis is 10 to 100,000. The EVOH resin composition is excellent in long-run formability, because the viscosity of the EVOH resin composition decreases with time during melt forming.

Where the iron compound (C) is present in an amount of 0.01 to 20 ppm on a metal basis based on the weight of the EVOH resin composition of the present disclosure, the EVOH resin composition is superior in long-run formability.

Where the alkali metal compound (B) is present in an amount of 1 to 1,000 ppm on a metal basis based on the weight of the EVOH resin composition of the present disclosure, the EVOH resin composition is superior in long-run formability.

The pellets formed from the melt-formable EVOH resin composition of the present disclosure are excellent in long-run formability, because the viscosity of the EVOH resin composition decreases with time when the pellets are used for the melt forming. Therefore, the pellets of the present disclosure can be advantageously used, for example, as a melt-formable packaging material for foods, chemicals, and agricultural chemicals.

The multilayer structure including the layer formed from the melt-formable EVOH resin composition of the present disclosure is particularly useful, for example, as a packaging material for foods, chemicals, and agricultural chemicals.

DESCRIPTION OF EMBODIMENTS

Preferred embodiments of the present disclosure will hereinafter be described in detail. It should be understood that these preferred embodiments are illustrative of the disclosure but not limitative of the disclosure.

The melt-formable EVOH resin composition of the present disclosure contains: (A) an EVOH resin as a main component; (B) an alkali metal compound; and (C) an iron compound. In the melt-formable EVOH resin composition, the EVOH resin (A) is contained as a base resin. That is, the proportion of the EVOH resin (A) in the EVOH resin composition is typically not less than 70 wt. %, preferably not less than 80 wt. %, more preferably not less than 90 wt. %, particularly preferably not less than 95 wt %. The melt-formable EVOH resin composition of the present disclosure will hereinafter sometimes be referred to simply as EVOH resin composition.

The respective components will hereinafter be described in turn.

[EVOH Resin (A)]

The EVOH resin (A) to be used in the present disclosure is a water-insoluble thermoplastic resin typically prepared by saponifying a copolymer of ethylene and a vinyl ester monomer, i.e., an ethylene-vinyl ester copolymer. Vinyl acetate is generally used as the vinyl ester monomer for economy.

A known polymerization method such as solution polymerization method, suspension polymerization method or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH resin (A) thus prepared mainly contains an ethylene structural unit and a vinyl alcohol structural unit, and further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be typically each used alone or, as required, a plurality of vinyl esters may be selected from these vinyl esters to be used in combination.

The ethylene structural unit content of the EVOH resin (A) can be controlled by adjusting the pressure of ethylene to be supplied when ethylene and the vinyl ester monomer are copolymerized. The ethylene structural unit content is typically 20 to 60 mol %, preferably 25 to 50 mol %, particularly preferably 25 to 48 mol %. If the ethylene structural unit content is excessively low, the EVOH resin tends to be poorer in high-humidity gas barrier property and stretchability. If the ethylene structural unit content is excessively high, on the other hand, the EVOH resin tends to be poorer in gas barrier property.

The ethylene structural unit content is measured in conformity with ISO14663.

The saponification degree of the vinyl ester component in the EVOH resin (A) can be controlled by adjusting the amount of a saponification catalyst (typically, an alkaline catalyst such as sodium hydroxide), a saponification temperature, a saponification period, and the like for the saponification of the ethylene-vinyl ester copolymer. The saponification degree is typically 90 to 100 mol %, preferably 95 to 100 mol %, particularly preferably 99 to 100 mol %. If the saponification degree is excessively low, the EVOH resin tends to be poorer in gas barrier property, thermal stability, humidity resistance, and the like.

The saponification degree of the EVOH resin (A) is measured in conformity with JIS K6726 (with the use of a solution obtained by homogenously dissolving the EVOH resin in a water/methanol solvent).

Further, the EVOH resin (A) typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR is excessively high, the EVOH resin tends to have unstable film formability. If the MFR is excessively low, the EVOH resin tends to have an excessively high viscosity, making the melt extrusion difficult.

The MFR, which is an index of the polymerization degree of the EVOH resin, can be controlled by adjusting the amount of a polymerization initiator and the amount of a solvent in the copolymerization of ethylene and the vinyl ester monomer.

The EVOH resin (A) to be used in the present disclosure may further contain a structural unit derived from any of the following comonomers in an amount (e.g., not greater than 10 mol % of the EVOH resin (A)) that does not impair the effects of the present disclosure.

The comonomers include: olefins such as propylene, 1-butene, and isobutene; hydroxyl-containing α-olefins such as 3-buten-1-ol, 3-butene-1,2-diol, 4-penten-1-ol, and 5-hexene-1,2-diol, and derivatives including esterification products and acylation products of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1- to C18-alkyl group; acrylamide compounds such as acrylamide, N-alkylacrylamides each including a C1- to C18-alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1- to C18-alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers such as alkyl vinyl ethers, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, halogenated allyl compounds such as allyl chloride; allyl alcohol compounds such as allyl alcohol and dimethoxyallyl alcohol; and trimethyl (3-acrylamido-3-dimethylpropyl)ammonium chloride and acrylamido-2-methylpropane sulfonic acid. These may be used alone or in combination.

An EVOH resin having a primary hydroxyl group in its side chain is preferred because of its excellent gas barrier property and excellent secondary formability. Particularly, an EVOH resin prepared by copolymerization with the hydroxyl-containing α-olefin is preferred, and an EVOH resin having a 1,2-diol structure in its side chain is especially preferred.

Particularly, where the EVOH resin having the primary hydroxyl group in its side chain is used, the content of a structural unit derived from the primary hydroxyl-containing monomer is typically 0.1 to 20 mol %, more preferably 0.5 to 15 mol %, particularly preferably 1 to 10 mol %, of the EVOH resin.

A post-modified EVOH resin such as an urethanized, acetalized, cyanoethylated or oxyalkylenated EVOH may be used as the EVOH resin (A) in the present disclosure.

The EVOH resin (A) to be used in the present disclosure may be a mixture of different EVOH resins. These EVOH resins may have different saponification degrees, and different polymerization degrees, and contain different comonomer components.

[Alkali Metal Compound (B)]

The EVOH resin composition of the present disclosure contains the alkali metal compound (B). The amount of the alkali metal compound (B) contained in the EVOH resin composition is typically 1 to 1,000 ppm, preferably 5 to 800 ppm, more preferably 10 to 700 ppm, particularly preferably 100 to 600 ppm, on a metal basis based on the weight of the EVOH resin composition. If the amount of the alkali metal compound (B) is excessively great, the productivity tends to be reduced. If the amount of the alkali metal compound (B) is excessively small, the heat stability tends to be reduced.

The amount of the alkali metal compound (B) is based on the weight of an EVOH resin composition as a final product which contains the EVOH resin (A), the alkali metal compound (B), the iron compound (C), and optional additives which are added to the resin composition as required.

Exemplary alkali metals for the alkali metal compound (B) to be used in the present disclosure include lithium, sodium, potassium, rubidium, and cesium, which may be used alone or in combination. Of these, sodium and potassium are preferred, and sodium is particularly preferred. The amount of the alkali metal compound is on a metal basis and, where two or more alkali metals are used in combination for the alkali metal compound (B), the amount of the alkali metal compound is the total amount of the alkali metals.

Examples of the alkali metal compound (B) include alkali metal salts and alkali metal hydroxides, which are preferably water-soluble. Particularly, the alkali metal salts are preferred for dispersibility.

The alkali metal compound (B) to be used in the present disclosure preferably excludes inorganic lamellar compounds and double salts from the viewpoint of economy and dispersibility.

The alkali metal compound (B) may be present, for example, as an alkali metal salt, in an ionized form, or in the form of an alkali metal complex with a resin or other ligands.

Examples of the alkali metal salts include: inorganic salts such as carbonates, hydrogen carbonates, phosphates, borates, sulfates, and chlorides of the alkali metals; C2 to C11 monocarboxylates such as acetates, butyrates, propionates, enanthates, and caprates of the alkali metals; C2 to C11 dicarboxylates such as oxalates, malonates, succinates, adipates, suberates, and sebacates of the alkali metals; monocarboxylates such as laurates, palmitates, stearates, 12-hydroxystearates, behenates, and montanates of the alkali metals, having a carbon number of 12 or more; and carboxylates such as provided by bonding the alkali metals to polymer terminal carboxyl groups of the EVOH resin. These may be used alone or in combination. The alkali metal compound (B) typically has a molecular weight of 20 to 10,000, preferably 20 to 1,000, particularly preferably 20 to 500.

Of these, the carboxylates of the alkali metals are preferred, and the C2 to C11 carboxylates of the alkali metals are particularly preferred. Particularly, the acetates of the alkali metals are more preferred.

The amount of the alkali metal compound (B) contained in the EVOH resin composition of the present disclosure is determined, for example, by heating and ashing the EVOH resin composition, treating the resulting ash with an acid such as hydrochloric acid, adding purified water to the resulting solution to a predetermined volume to prepare a sample liquid, and analyzing the sample liquid by an atomic absorption spectrometer.

[Iron Compound (C)]

The melt-formable EVOH resin composition of the present disclosure contains the EVOH (A), the alkali metal compound (B), and the iron compound (C), wherein the alkali metal compound (B) and the iron compound (C) are present at a specific weight ratio. With this arrangement, the viscosity of the EVOH resin composition decreases with time during the melt forming. Thus, the EVOH resin composition is excellent in long-run formability.

The amount of the iron compound (C) contained in the EVOH resin composition of the present disclosure is 0.01 to 20 ppm on a metal basis based on the weight of the EVOH resin composition. The amount of the iron compound (C) is preferably 0.01 to 5 ppm, more preferably 0.05 to 1 ppm, particularly preferably 0.08 to 0.5 ppm.

If the amount of the iron compound (C) is excessively small, the viscosity of the EVOH resin composition tends to insufficiently decrease during the melt forming. If the amount of the iron compound (C) is excessively great, a product formed from the EVOH resin composition tends to be colored.

The amount of the iron compound (C) is determined, for example, by pulverizing the EVOH resin composition, asking 0.5 g of the pulverized EVOH resin composition at 650° C. for 1 hour in an oxygen stream in an infrared heating oven, dissolving the resulting ash in an acid, diluting the resulting solution to a predetermined volume with purified water to prepare a sample solution, and analyzing the sample solution through a standard addition method by an ICP-MS (ICP mass spectrometer 7500ce available from Agilent Technologies, Inc.)

The iron compound (C) may be present as an iron oxide, an iron hydroxide, an iron chloride or an iron salt, in an ionized form, or in the form of a complex coordinated with the resin or other ligands in the EVOH resin composition. Examples of the iron oxide include ferric oxide, ferrosoferric oxide, and ferrous oxide. Examples of the iron chloride include ferrous chloride, and ferric chloride. Examples of the iron hydroxide include ferrous hydroxide, and ferric hydroxide. Examples of the iron salt include inorganic salts such as iron phosphate and iron sulfate, and organic salts such as iron carboxylates (e.g., iron acetate, iron butyrate, iron stearate, and the like). These may be used alone or in combination.

From the viewpoint of the dispersibility in the EVOH resin composition, the iron compound (C) is preferably water-soluble. From the viewpoint of the dispersibility and the productivity, the iron compound (C) typically has a molecular weight of 100 to 10,000, preferably 100 to 1,000, particularly preferably 100 to 500.

In the EVOH resin composition of the present disclosure, the weight ratio of the alkali metal compound (B) to the iron compound (C) on a metal basis is typically 10 to 100,000, preferably 30 to 50,000, particularly preferably 100 to 20,000, especially preferably 1,000 to 10,000. If the weight ratio is excessively high, the viscosity of the EVOH resin composition will excessively decrease with time. If the weight ratio is excessively low, a product formed from the EVOH resin composition tends to be colored.

[Other Thermoplastic Resin]

The EVOH resin composition of the present disclosure may contain a thermoplastic resin other than the EVOH resin (A) in an amount (e.g., typically not greater than 30 wt. %, preferably not greater than 20 wt. %, particularly preferably not greater than 10 wt. % based on the weight of the EVOH resin composition) that does not impair the effects of the present disclosure.

A known thermoplastic resin may be used as the other thermoplastic resin. Specific examples of the thermoplastic resin include polyamide resins, polyolefin resins, polyester resins, polystyrene resins, polyvinyl chloride resins, polycarbonate resins, polyacrylic resins, ionomers, ethylene-acrylic acid copolymers, ethylene-acrylate copolymers, ethylene-methacrylic acid copolymers, ethylene-methacrylate copolymers, polyvinylidene chlorides, vinyl ester resins, polyester elastomers, polyurethane elastomers, chlorinated polyethylenes, and chlorinate polypropylenes, which may be used alone or in combination.

[Other Additives]

The EVOH resin composition of the present disclosure may contain additives that are generally blended with the EVOH resin, as long as the effects of the present disclosure are not impaired. Examples of the additives include: inorganic double salt (e.g., hydrotalcites) other than inorganic double salts of the alkali metals; plasticizer (e.g., aliphatic polyhydric alcohol such as ethylene glycol, glycerin or hexanediol); oxygen absorber [e.g., inorganic oxygen absorber such as aluminum powder or photo-catalytic titanium oxide; organic compound oxygen absorber such as polyhydric phenol compound (e.g., ascorbic acid, ascorbic acid ester, ascorbic acid metal salt other than alkali metal ascorbates, hydroquinone, gallic acid, hydroxyl-containing phenol aldehyde resin or the like), coordination compound obtained by coordination-bonding nitrogen-containing compound and non-iron transition metal (e.g., bis-salicylaldehyde-imine cobalt, tetraethylenepentamine cobalt, cobalt-Schiff base complex, porphyrins, macrocyclic polyamine complex, polyethyleneimine-cobalt complex or the like), terpene compound, reaction product obtained by reaction between amino acid and hydroxyl-containing reductive substance, triphenylmethyl compound or the like; or polymer oxygen absorber such as coordination compound obtained by coordination-bonding nitrogen-containing resin and non-iron transition metal (e.g., combination of methyl xylylenediamine (MXD) nylon and cobalt), blend of tertiary hydrogen-containing resin and non-iron transition metal (e.g., combination of polypropylene and cobalt), blend of unsaturated carbon-carbon bond-containing resin and non-iron transition metal (e.g., combination of polybutadiene and cobalt), photo-oxidation degradative resin (e.g., polyketone), anthraquinone polymer (e.g., polyvinylanthraquinone), or mixture containing any of these blends and photo initiator (benzophenone or the like), peroxide scavenger (commercially available antioxidant or the like) or deodorant (active carbon or the like)]; thermal stabilizer; photo stabilizer; UV absorber; colorant; antistatic agent; surfactant (not serving as lubricant); antibacterial agent; antiblocking agent; and filler (e.g., inorganic filler or the like). These compounds may be used alone or in combination.

[EVOH Resin Composition Production Method]

Exemplary methods to be used for producing the EVOH resin composition in the present disclosure include dry blending method, melt mixing method, solution mixing method, impregnation method, and other known methods. These methods may be used in combination. A common ethylene-vinyl acetate copolymer, which is used as a precursor of the EVOH resin, is saponified with the use of an alkali metal catalyst. Thus, an EVOH resin containing an alkali metal acetate or the like by-produced as the alkali metal compound (B) is produced, and then rinsed. In this manner, an intended amount of the alkali metal compound (B) is incorporated in the EVOH resin. The use of the alkali metal compound-containing EVOH resin as an ingredient is preferred for the productivity.

An example of the dry blending method is a method (i) in which pellets of the EVOH resin (A), the alkali metal compound (B), and the iron compound (C) are dry-blended by means of a tumbler or the like.

Examples of the melt mixing method include a method (ii) in which pellets of the EVOH resin (A), the alkali metal compound (B), and the iron compound (C) are dry-blended and the resulting dry blend is melt-kneaded and formed into pellets or other product, and a method (iii) in which the alkali metal compound (B) and the iron compound (C) are added to and melt-mixed with the EVOH resin in a melted state, and the resulting mixture is formed into pellets or other product.

Examples of the solution mixing method include a method (iv) in which at least one of the alkali metal compound (B) and the iron compound (C) is added to a solution prepared by using commercially available pellets of the EVOH resin (A), and the resulting solution is solidified into pellets, which are in turn separated from the solution and dried, and a method (v) in which at least one of the alkali metal compound (B) and the iron compound (C) is added to a homogeneous solution (water/alcohol solution or the like) of the EVOH resin in the production of the EVOH resin (A), and the resulting solution is solidified into pellets, which are in turn separated from the solution and dried.

An example of the impregnation method is a method (vi) in which at least one of the alkali metal compound (B) and the iron compound (C) is incorporated into pellets of the EVOH resin (A) by bringing the EVOH resin pellets into contact with an aqueous solution containing the at least one of the alkali metal compound (B) and the iron compound (C), and then the resulting pellets are dried.

In a method (vii), a methanol solution of the EVOH resin containing a non-oxidizable acid (e.g., hydrochloric acid or acetic acid) at a high concentration is transported through a gear pump or the like, whereby a very small amount of an iron compound is released from a stainless steel of a driving portion of the gear pump. Thus, the very small amount of the iron compound (C) is incorporated into the EVOH resin (A).

Then, EVOH resin pellets containing the EVOH resin (A) and the iron compound (C) are formed from the methanol solution of the EVOH resin subjected to the aforementioned process, and dry-blended with the alkali metal compound (B) and/or melt-mixed with the alkali metal compound (B) and pelletized. In another exemplary method, the alkali metal compound (B) is incorporated to the EVOH resin pellets containing the EVOH resin (A) and the iron compound (C) by an impregnation method and dried, whereby the pellets are produced.

In the present disclosure, any of the aforementioned different methods may be used in combination. Of these methods, the melt mixing method is preferred, and the methods (ii) and (vii) are particularly preferred, because these methods each ensure higher productivity and provide a resin composition significantly improved in the effects of the present disclosure.

Pellets of the EVOH resin composition of the present disclosure to be produced by any of the aforementioned methods, and the pellets of the EVOH resin (A) to be used in any of the aforementioned methods may each have any desired shape. The pellets may each have, for example, spherical shape, oval shape, cylindrical shape, cubic shape, square prism shape, or the like, and typically the oval shape or the cylindrical shape. The oval pellets typically each have a minor diameter of 1 to 10 mm and a major diameter of 1.5 to 30 mm, preferably a minor diameter of 2 to 6 mm and a major diameter of 3 to 20 mm, more preferably a minor diameter of 2.5 to 5.5 ram and a major diameter of 3.5 to 10 mm, and the cylindrical pellets typically each have a bottom diameter of 1 to 6 mm and a length of 1 to 6 mm, preferably a bottom diameter of 2 to 5 mm and a length of 2 to 5 mm, for easy handling thereof in the subsequent use as a forming material.

As described above, a water-soluble iron compound is used as the iron compound (C) in the aforementioned methods. Examples of the water-soluble iron compound include: iron oxides such as ferric oxide, ferrosoferric oxide, and ferrous oxide; iron chlorides such as ferrous chloride and ferric chloride; iron hydroxides such as ferrous hydroxide and ferric hydroxide; inorganic iron salts such as iron phosphate and iron sulfate; and organic iron salts such as iron carboxylates (e.g., iron acetate, iron butyrate, iron stearate, and the like). As described above, the iron compound (C) may be present in the form of a salt, in an ionized form, or in the form of a complex coordinated with the resin or other ligands in the EVOH resin.

Usable as the aqueous solution of the iron compound in the method (vi) are an aqueous solution of any of the aforementioned iron compounds (C), and an aqueous solution which contains iron ions released from a steel material immersed in water containing chemical agents. In this case, the amount (on a metal basis) of the iron compound (C) to be contained in the EVOH resin composition may be controlled by adjusting the concentration of the iron compound (C) in the aqueous solution in which the pellets of the EVOH resin (A) are immersed, the immersion temperature, the immersion period, and/or the like. The immersion period is typically 0.5 to 48 hours, preferably 1 to 36 hours, and the immersion temperature is typically 10° C. to 40° C., preferably 20° C. to 35° C.

The EVOH resin composition pellets are separated from the aqueous solution by a known method, and dried by a known drying method. Various drying methods are usable for the drying, and examples of the drying methods include a stationary drying method and a fluidized drying method, which may be used alone or in combination.

The EVOH resin composition of the present disclosure typically has a water content of 0.01 to 0.5 wt. %, preferably 0.05 to 0.35 wt. %, particularly preferably 0.1 to 0.3 wt. %.

In the present disclosure, the water content of the EVOH resin composition is measured and calculated in the following manner.

The weight (W1) of the EVOH resin composition pellets is measured by an electronic balance, and the EVOH resin composition pellets are dried at 150° C. for 5 hours in a hot air dryer and cooled for 30 minutes in a desiccator. Then, the weight (W2) of the resulting pellets is measured. The water content of the EVOH resin composition is calculated from the following expression:

$$\text{Water content (wt. \%)} = [(W1-W2)/W1] \times 100$$

In the aforementioned manner, the EVOH resin composition is produced (in a pellet form).

The EVOH resin composition has a viscometric property such that the viscosity of the EVOH resin composition decreases with time by heating.

Evaluation for the viscometric property is based on a weight reduction percentage. The EVOH resin composition of the present disclosure typically has a weight reduction percentage of 0.7 to 1.1%, preferably 0.8 to 1.0%, particularly preferably 0.9%. If the weight reduction percentage is excessively low (weight reduction is excessively small), the EVOH resin composition is less susceptible to decomposition, and the viscosity of the EVOH resin composition tends to increase with time during the melt forming, resulting in reduction in long-run formability. If the weight reduction percentage is excessively high (weight reduction is excessively great), the EVOH resin composition is more liable to be decomposed and foamed due to gas generated by the decomposition. This tends to adversely influence the appearance of the formed product.

The weight reduction percentage is determined by pulverizing the EVOH resin composition to a size of 1- to 5-mm square, heating 5 mg of the pulverized EVOH resin composition at a temperature of 230° C. at a gas flow rate of 20 mL/minute for 1 hour in a nitrogen atmosphere by means of a thermogravimeter (PYRIS 1 TGA available from Perkin Elmer, Inc.) and calculating the weight reduction percentage from the following expression based on the weights of the EVOH resin composition measured before and after the heating:

$$\text{Weight reduction percentage (\%)} = [(W_b - W_a)/W_b] \times 100$$

wherein $W_b$ is the weight of the EVOH resin composition before the heating, and $W_a$ is the weight of the EVOH resin composition after the heating.

The EVOH resin composition may be prepared in any of various forms, e.g., in a pellet form or in a powdery form, for use as a melt-formable material for various formed products. The EVOH resin composition of the present disclosure may be a resin composition prepared by mixing the EVOH resin composition with a resin other than the EVOH resin (A).

Exemplary products to be formed from the EVOH resin composition for practical applications include a single-layer film formed by using the EVOH resin composition, and a multilayer structure including the layer formed by using the EVOH resin composition.

[Multilayer Structure]

The multilayer structure formed by using the melt-formable EVOH resin composition of the present disclosure includes a layer formed from the EVOH resin composition.

The layer containing the EVOH resin composition (hereinafter referred to simply as "EVOH resin composition layer") may be laminated with some other base material containing a thermoplastic resin other than the EVOH resin composition as a main component (a resin to be used for the base material will hereinafter be referred to simply as "base resin"). Thus, the EVOH resin composition layer can be strengthened, protected from moisture and other influence, or imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block or random) copolymers, and ethylene-α-olefin (C4 to C20 α-olefin) copolymers, polypropylene resins such as polypropylenes, and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, aromatic and aliphatic polyketones.

Of these, the polyamide resins, the polyolefin resins, the polyester resins, and polystyrene resins, which are hydrophobic resins, are preferred, and the polyolefin resins such as the polyethylene resins, the polypropylene resins, the polycycloolefin resins, and the unsaturated carboxyl-modified polyolefin resins obtained by modifying these polyolefin resins are more preferred.

Where EVOH resin composition layers a (a1, a2, ...) formed from the melt-formable EVOH resin composition of the present disclosure and base resin layers b (b1, b2, ...) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. Where the multilayer structure further includes a recycle layer R formed of a mixture obtained by re-melting cutoff pieces and defective products occurring during the production of the multilayer structure and containing the EVOH resin composition and the thermoplastic resin other than the EVOH resin composition, possible combinations of the layers for the layered configuration include b/R/a, b/R/a/b, b/R/a/R/b, b/a/R/a/b, b/R/a/R/a/R/b, and the like. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin is properly selected according to the type of the thermoplastic resin to be used for the base resin layers b. Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride, which may be used alone or in combination.

Where the adhesive resin layers are provided between the EVOH resin composition layer formed from the melt-formable EVOH resin composition of the present disclosure and the base resin layers in the multilayer structure, the adhesive resin layers are present on opposite sides of the EVOH resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., in amounts of not greater than 30 wt. %, preferably not greater than 10 wt. %). These may be used alone or in combination.

A known laminating method may be employed for laminating the EVOH resin composition layer formed from the melt-formable EVOH resin composition of the present disclosure with the base resin layer (optionally with the adhesive resin layer provided between the layers). Examples of the laminating method include: a method in which a film or a sheet of the EVOH resin composition is laminated with the base resin by melt extrusion; a method in which the base resin layer is laminated with the EVOH resin composition by melt extrusion; a method in which the EVOH resin composition and the base resin are coextruded; a method in which the film (layer) of the EVOH resin composition and the film (layer) of the base resin are dry-laminated together with the use of a known adhesive agent such as of organic titanium compound, isocyanate compound, polyester compound or polyurethane compound; and a method in which a solution of the EVOH resin composition is applied on the base resin layer, and a solvent is removed from the applied solution. Of these methods, the coextrusion method is preferred in consideration of costs and environmental concerns.

The multilayer structure described above may be further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is preferably close to the melting point of the multilayer structure, and is typically selected from a range of about 40° C. to about 170° C., preferably about 60° C. to about 160° C. If the stretching temperature is excessively low, poorer stretchability will result. If the stretching temperature is excessively high, it will be difficult to ensure stable stretching.

The resulting multilayer structure may be further subjected to a heat-setting process to ensure dimensional stability after the stretching. The heat-setting process may be performed in a known manner. For example, the stretched multilayer structure is typically heat-treated at 80° C. to 180° C., preferably 100° C. to 165° C., for about 2 to about 600 seconds, while being kept tense. Where the stretched multilayer film produced by using the melt-formable EVOH resin composition of the present disclosure is used as a shrinkable film, for example, the stretched film may be cold-set so as to be imparted with a heat-shrinkable property by applying cold air over the stretched film without performing the above heat-setting process.

In some case, a cup-shaped or tray-shaped multilayer container may be produced from the multilayer structure formed by using the melt-formable EVOH resin composition of the present disclosure. For the production of the multilayer container, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the EVOH resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 μm, preferably 30 to 3,000 μm, particularly preferably 50 to 2,000 μm. The thickness of the EVOH resin composition layer is typically 1 to 500 μm, preferably 3 to 300 μm, particularly preferably 5 to 200 μm. The thickness of the base resin layer is typically 5 to 3,000 μm, preferably 10 to 2,000 μm, particularly preferably 20 to 1,000 μm. The thickness of the adhesive resin layer is typically 0.5 to 250 μm, preferably 1 to 150 μm, particularly preferably 3 to 100 μm.

The thickness ratio between the EVOH resin composition layer and the base resin layer of the multilayer structure (EVOH resin composition layer/base resin layer) (if these layers each include a plurality of layers, the thickness ratio between the thickest one of the EVOH resin composition layers and the thickest one of the base resin layers) is typically 1/99 to 50/50, preferably 5/95 to 45/55, particularly preferably 10/90 to 40/60. The thickness ratio between the EVOH resin composition layer and the adhesive resin layer of the multilayer structure (EVOH resin composition layer/ adhesive resin layer) (if these layers each include a plurality of layers, the thickness ratio between the thickest one of the EVOH resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers, and caps produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, and pharmaceutical products.

In particular, the EVOH resin composition layer formed from the melt-formable EVOH resin composition of the present disclosure has a satisfactory UV absorbing ability and, therefore, is particularly useful as a food packaging material, particularly, for packaging raw meat, ham, sausage and other meat products which are liable to be discolored due to ultraviolet radiation.

EXAMPLES

The embodiments of the present disclosure will hereinafter be described more specifically by way of examples thereof. However, it should be understood that the present disclosure be not limited to the examples within the scope of the present disclosure.

In the following examples, "parts" means "parts by weight" unless otherwise specified.

Example 1

An ethylene-vinyl alcohol copolymer having an ethylene structural unit content of 44 mol %, a saponification degree of 99.6 mol %, and an MFR of 12 g/10 minutes (as measured at 210° C. with a load of 2160 g) was used as the EVOH resin (A). An acetic acid aqueous solution was added to a methanol solution of the EVOH resin (having a resin concentration of 36 wt. %) in an acetic acid amount of 1.5 parts based on 100 parts of the EVOH resin. The methanol solution was fed through a gear pump, and extruded into strands in water from a round die head. Then, the strands were cut into cylindrical pellets.

The pellets thus produced were kept in contact with an acetic acid aqueous solution (having an acetic acid concentration of 2,200 ppm) at a bath ratio of 2.5 at 35° C. for 3 hours. Then, the resulting pellets were dried at 100° C. for 36 hours in a nitrogen stream. Thus, EVOH resin pellets having an ethylene structural unit content of 44 mol %, a saponification degree of 99.6 mol %, and an MFR of 12 g/10 minutes (as measured at 210° C. with a load of 2160 g) were prepared.

Then, 10 g of the EVOH resin pellets thus prepared were heated at 700° C. for 3 hours in an electric oven. A small amount of purified water and 2 mL of hydrochloric acid were added to the resulting sample, and the sample was dissolved in the hydrochloric acid solution. The resulting sample was put in a measuring flask, and diluted with purified water. The resulting sample solution was analyzed by an atomic absorption spectrometer (Z-2300 available from HITACHI Corporation), whereby the amount of the alkali metal compound (B) on a metal basis per unit weight of the EVOH resin composition was measured. The amount of the alkali metal compound (B) contained in the EVOH resin pellets was 0.4 ppm on a metal basis.

Further, 0.5 g of the EVOH resin pellets prepared in the aforementioned manner were heated at 650° C. for 1 hour in an oxygen stream in an infrared heating oven to be thereby ashed. The resulting ash was dissolved in an acid, and the resulting solution was diluted to a predetermined volume with purified water, whereby a sample solution was prepared. The sample solution was analyzed through a standard addition method by an ICP-MS (ICP mass spectrometer 7500ce available from Agilent Technologies, Inc.) Thus, the amount of the iron compound (C) (on a metal basis) per unit weight of the EVOH resin pellets was measured. The measurement result is shown below in Table 1.

Then, 100 parts of the EVOH resin pellets prepared in the aforementioned manner and 0.18 parts of sodium acetate (available from Wako Pure Chemical Industries, Ltd.) as the alkali metal compound (B) were melt-kneaded at 210° C. for 5 minutes by means of a plastograph (available from Brabender Corporation). The resulting mixture was cooled, and then pulverized, whereby an EVOH resin composition was prepared.

The EVOH resin composition was evaluated for viscometric property in the following manner. The results are shown below in Table 1.

[Evaluation for Viscometric Property]

The weight reduction percentage was determined by heating 5 mg of the pulverized EVOH resin composition at a temperature of 230° C. at a gas flow rate of 20 mL/minute for 1 hour in a nitrogen atmosphere by means of a thermogravimeter (PYRIS 1 TGA available from Perkin Elmer, Inc.) and calculating the weight reduction percentage from the following expression based on the weights of the EVOH resin composition measured before and after the heating:

$$\text{Weight reduction percentage (\%)} = [(W_b - W_a)/W_b] \times 100$$

wherein $W_b$ is the weight of the EVOH resin composition before the heating, and $W_a$ is the weight of the EVOH resin composition after the heating.

The weight reduction percentage was rounded to the first decimal place. The EVOH resin composition was evaluated for viscometric property based on the following evaluation criteria:

A: 0.9% (Particularly superior viscometric property)
B: 0.8% or 1.0% (Superior viscometric property)
C: 0.7% or 1.1% (Excellent viscometric property)
D: 0.6% (Poor viscometric property)
E: Less than 0.5% or not less than 1.2% (Very poor viscometric property)

Example 2

An EVOH resin composition was prepared by melt-kneading 100 parts of the same EVOH resin pellets as used in Example 1, 0.18 parts of sodium acetate (available from Wako Pure Chemical Industries, Ltd.) as the alkali metal compound (B), and 0.0034 parts of Iron (III) phosphate n-hydrate (available from Wako Pure Chemical Industries, Ltd., and having a drying loss of 20.9 wt. % when being dried at 230° C.) at 210° C. for 5 minutes by means of a plastograph (available from Brabender Corporation), cooling the resulting mixture, and pulverizing the mixture. The EVOH resin composition thus prepared was evaluated in the same manner. The results are shown below in Table 1.

Comparative Example 1

An EVOH resin composition was prepared in substantially the same manner as in Example 1, except that sodium acetate was not blended. The EVOH resin composition thus prepared was evaluated in the same manner. The results are shown below in Table 1.

Comparative Example 2

An EVOH resin composition was prepared in substantially the same manner as in Example 2, except that sodium acetate was not blended. The EVOH resin composition thus prepared was evaluated in the same manner. The results are shown below in Table 1.

Comparative Example 3

An EVOH resin composition was prepared in substantially the same manner as in Example 1, except that an ethylene-vinyl alcohol copolymer having an ethylene structural unit content of 29 mol %, a saponification degree of 99.6 mol %, and an MFR of 3.9 g/10 minutes (as measured at 210° C. with a load of 2160 g) (containing the iron compound (C) in an amount of 0 ppm on a metal basis) was used as the EVOH resin (A). The EVOH resin composition thus prepared was evaluated in the same manner. The results are shown below in Table 1.

TABLE 1

|  | Example 1 | Example 2 | Comparative Example 1 | Comparative Example 2 | Comparative Example 3 |
|---|---|---|---|---|---|
| Amount (ppm) of alkali metal compound (B) on metal basis | 500 | 500 | 0.4 | 0.4 | 500 |
| Amount (ppm) of iron compound (C) on metal basis | 0.1 | 10 | 0.1 | 10 | — |
| Alkali metal compound amount (B)/iron compound amount (C) on metal basis | 5,000 | 50 | 4 | 0.04 | — |
| Viscometric property evaluation | | | | | |
| Weight reduction percentage (%) | 0.9 | 0.8 | 0.1 | 0.1 | 1.3 |
| Rating | A | B | E | E | E |

In Comparative Examples 1 and 2 in which the alkali metal compound (B) and the iron compound (C) were not contained at the specific weight ratio, the EVOH resin compositions each had a lower weight reduction percentage substantially without decomposition. Therefore, when the EVOH resin compositions were subjected to long-run forming, viscosities of the EVOH resin compositions were increased with time, supposedly reducing the long-run formability.

In Comparative Example 3 in which the alkali metal compound (B) was contained but the iron compound (C) was not contained, the weight reduction percentage was high. This means that the EVOH resin composition was excessively thermally decomposed.

In Examples 1 and 2 in which the alkali metal compound (B) and the iron compound (C) were contained at the specific weight ratio, in contrast, the viscometric property was unexpectedly improved.

In Examples 1 and 2, the viscometric property was improved as the amount of the iron compound (C) was reduced. When the EVOH resin compositions were subjected to the long-run forming, the viscosities of the resin compositions decreased with time. This means that the EVOH resin compositions are excellent in long-run formability. These results are inconsistent with the results in Comparative Examples 1 and 2. The excellent long-run formability is achieved only by incorporating the alkali metal compound (B) and the iron compound (C) at the specific weight ratio to the EVOH resin composition.

The conditions for the viscometric property evaluation are much less rigorous than the conditions for actual use applications of the resin composition. This evaluation indicates that Examples are even more superior in practical applications. That is, where the resin composition is actually used in an extruder, the resin inevitably stagnates in an adapter, a feed block, a die, and other mechanical structural portions of the extruder. The stagnating resin is liable to be exposed to conditions that are much severer than the aforementioned evaluation conditions. Therefore, it is considered that the differences in viscometric property between Examples and Comparative Examples in the evaluation are significantly amplified in the practical applications.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The melt-formable EVOH resin composition of the present disclosure is excellent in long-run formability because its viscosity decreases with time during melt forming. Therefore, the melt-formable EVOH resin composition of the present disclosure is useful as a material for containers for packaging general foods, condiments such as mayonnaise and dressing, fermented foods such as miso, fat and oil such as salad oil, beverages, cosmetics, and pharmaceutical products.

The invention claimed is:

1. A melt-formable ethylene-vinyl alcohol copolymer composition comprising:
    (A) an ethylene-vinyl alcohol copolymer;
    (B) an alkali metal compound; and
    (C) an iron compound;
    wherein the iron compound (C) is present in an amount of 0.01 to less than 1 ppm on a metal basis based on the weight of the melt-formable ethylene-vinyl alcohol copolymer composition; and
    wherein a weight ratio of the alkali metal compound (B) to the iron compound (C) on a metal basis is 10 to 100,000.

2. The melt-formable ethylene-vinyl alcohol copolymer composition according to claim 1, wherein the iron compound (C) is present in an amount of 0.01 to 0.5 ppm on a metal basis based on the weight of the ethylene-vinyl alcohol copolymer composition.

3. The melt-formable ethylene-vinyl alcohol copolymer composition according to claim 1, wherein the alkali metal compound (B) is present in an amount of 1 to 1,000 ppm on a metal basis based on the weight of the ethylene-vinyl alcohol copolymer composition.

4. A pellet comprising the melt-formable ethylene-vinyl alcohol copolymer composition according to claim 1.

5. A multilayer structure comprising a layer which comprises the melt-formable ethylene-vinyl alcohol copolymer composition according to claim 1.

* * * * *